(12) United States Patent
Blanco et al.

(10) Patent No.: US 12,307,691 B2
(45) Date of Patent: May 20, 2025

(54) METHOD AND SYSTEM FOR ESTIMATING FLARED GAS QUANTITIES BY USING SWIR IMAGES ACQUIRED BY A SPACEBORNE IMAGE SENSOR

(71) Applicant: TotalEnergies OneTech, Courbevoie (FR)

(72) Inventors: Benoit Blanco, Pau (FR); Léo Turon, Pau (FR)

(73) Assignee: TotalEnergies OneTech, Courbevoie (FR)

( * ) Notice: Subject to any disclaimer, the term of this patent is extended or adjusted under 35 U.S.C. 154(b) by 406 days.

(21) Appl. No.: 17/941,512

(22) Filed: Sep. 9, 2022

(65) Prior Publication Data
US 2023/0070330 A1 Mar. 9, 2023

(30) Foreign Application Priority Data
Sep. 9, 2021 (EP) .................................. 21306233

(51) Int. Cl.
*G06T 7/33* (2017.01)
*H04N 5/33* (2023.01)

(52) U.S. Cl.
CPC ............. *G06T 7/33* (2017.01); *H04N 5/33* (2013.01); *G06T 2207/10048* (2013.01)

(58) Field of Classification Search
CPC ... G06T 7/33; G06T 2207/10048; H04N 5/33; G06V 20/13

USPC ........................................................ 382/128
See application file for complete search history.

(56) References Cited

U.S. PATENT DOCUMENTS

2017/0148184 A1* 5/2017 Kraus ..................... G06T 7/60
2020/0116583 A1* 4/2020 Hedberg ................. G01M 3/04

FOREIGN PATENT DOCUMENTS

WO 2021/148837 A1 7/2021

OTHER PUBLICATIONS

Extended European Search Report for Application No. EP 21306233. 4, dated Feb. 28, 2022, 6 pgs.
(Continued)

*Primary Examiner* — Neil R McLean
(74) *Attorney, Agent, or Firm* — Seed IP Law Group LLP

(57) ABSTRACT

A computer-implemented method for estimating a quantity of gas flared at a gas flaring site includes obtaining a short-wave infrared, SWIR, estimation image of the gas flaring site. The estimation image is acquired by a spaceborne image sensor and includes pixels representing a radiation measured in the SWIR wavelength band. The estimation image is segmented by detecting pixels which represent flared gas heated atmosphere, thereby obtaining a segmented estimation image. A surface of flared gas heated atmosphere is determined based on the segmented estimation image, and the quantity of flared gas is determined based on the surface of flared gas heated atmosphere, by using a model associating surfaces of flared gas heated atmosphere with corresponding quantities of flared gas quantities.

20 Claims, 2 Drawing Sheets

(56) References Cited

OTHER PUBLICATIONS

Elvidge, C.D. et al., "VIIRS Nightfire: Satellite Pyrometry at Night", Remote Sensing, vol. 5, No. 9, Sep. 11, 2013, 27 pgs.
Elvidge, C.D. et al., "Methods for Global Survey of Natural Gas Flaring from Visible Infrared Imaging Radiometer Suite Data", energies, vol. 9, No. 1, Dec. 25, 2015, 15 pgs.
Ronneberger, O. et al., "U-Net: Convolutional Networks for Biomedical Image Segmentation", International Conference on Medical image computing and computer-assisted intervention, Springer, Cham, 2015, pp. 234-241, 8 pgs.

* cited by examiner

METHOD AND SYSTEM FOR ESTIMATING FLARED GAS QUANTITIES BY USING SWIR IMAGES ACQUIRED BY A SPACEBORNE IMAGE SENSOR

BACKGROUND

Technical Field

This disclosure relates to the field of image processing and relates more particularly to the estimation of flared gas quantities at gas flaring sites, by using images acquired by spaceborne image sensors.

Description of the Related Art

Unwanted gas is a by-product of numerous industrial processes including oil and gas extraction, petrochemical processes, landfill gas production, wastewater treatment, etc.

Such unwanted gases are sometimes eliminated by gas flaring, i.e., by burning these unwanted gases.

Gas flares (also known as flare stacks, flare booms, etc.) are gas combustion devices used at industrial sites such as petroleum refineries, chemical sites and natural gas processing sites. They are also common at oil or gas extraction sites having oil wells, gas wells, offshore oil and gas rigs. At oil and gas extraction sites, gas flares are for instance used for a variety of start up, maintenance, testing, safety, and emergency purposes.

Flared gas mixtures differ depending on the generating source as chemical compositions vary across different industrial processes. For example, natural gas is composed mostly of methane, some ethane and variable quantities of other hydrocarbons and other gases.

For instance, gas flaring of methane converts it to $CO_2$, and methane's estimated global warming potential is much greater than that of $CO_2$. Hence, when unwanted gas including methane is generated, and when no alternatives to releasing this unwanted gas into the atmosphere are possible, it is better to burn this unwanted gas beforehand via gas flaring in order to release $CO_2$ instead. However, gas flaring emissions are more and more regulated, and there exists a need for being able to estimate and verify the quantity of gas flared at a given gas flaring site (e.g., oil or gas extraction site) without relying on measurements provided by sensors at the considered gas flaring site.

BRIEF SUMMARY

The present disclosure aims at improving the situation. In particular, the present disclosure aims at overcoming at least some of the limitations of the prior art discussed above, by proposing a solution for estimating a quantity of gas flared at a gas flaring site by using images acquired by spaceborne image sensors, e.g., satellite-based image sensors.

According to a first aspect, the present disclosure relates to a computer-implemented method for estimating a quantity of gas flared at a gas flaring site, wherein said method comprises:
 obtaining an estimation image of the gas flaring site, said estimation image acquired by a spaceborne image sensor and comprising pixels representing a radiation measured in a short-wave infrared, SWIR, wavelength band;
 segmenting the estimation image by detecting pixels which represent flared gas heated atmosphere, thereby obtaining a segmented estimation image;
 determining a surface of flared gas heated atmosphere based on the segmented estimation image; and
 determining the quantity of flared gas based on the surface of flared gas heated atmosphere, by using a previously established model associating surfaces of flared gas heated atmosphere with corresponding quantities of flared gas quantities.

Flared gases usually have temperatures above 1300 Kelvin degrees (K). Such temperature levels can be detected in SWIR wavelengths, i.e., wavelengths between 1000 nanometers (nm) and 3000 nm. Hence, the present disclosure uses SWIR images, which can be acquired by a spaceborne image sensor, e.g., an image sensor on-board a satellite in terrestrial orbit, e.g., a Low Earth Orbit (LEO), a Medium Earth Orbit (MEO), etc. Currently, such SWIR images are for instance recurrently acquired by the image sensors on-board the Sentinel-2 satellites, such that these images can be used for estimating the quantity of flared gas at existing gas flaring sites, without needing to obtain measurements from sensors located at these gas flaring sites.

An image used for estimating the quantity of flared gas at a gas flaring site is referred to as "estimation image".

The estimation image is then segmented to classify each pixel of the estimation image as either representing atmosphere heated by flared gas or not representing flared gas heated atmosphere. Indeed, the gas burned at a gas flare will also increase substantially the temperature of the surrounding atmosphere, such that the surrounding areas which have been heated by the flared gas can also be detected in the SWIR images and classified as representing flared gas heated atmosphere.

The more flared gas, the more heated atmosphere, such that the surface covered by the flared gas heated atmosphere increases with the quantity of flared gas. Since the surface covered by the flared gas heated atmosphere is represented in the estimation image by the pixels labelled as representing flared gas heated atmosphere, the number of pixels representing flared gas heated atmosphere in the estimation image should increase when the quantity of flared gas increases.

Hence, the surface of the flared gas heated atmosphere can be determined based on the segmentation image, and more specifically based on the pixels representing flared gas heated atmosphere. It should be noted that the surface may be determined in, e.g., square meters ($m^2$) for instance, based on the unit surface represented by each pixel and based on the number of pixels representing flared gas heated atmosphere in the segmentation image. In some cases, the surface may also be determined as the number of pixels representing flared gas heated atmosphere in the segmentation image, etc.

The estimation method then uses a previously established model. Said model basically associates different surfaces of flared gas heated atmosphere with respective different quantities of flared gas. In other words, the model describes the relation between the surface of flared gas heated atmosphere and the quantity of flared gas. Hence, the model may be used to retrieve the quantity of flared gas which, according to said model, is associated to the surface of flared gas heated atmosphere measured in the estimation image. The model may for instance be established as a lookup table (LUT), or as a mathematical function, etc.

In specific embodiments, the estimation method can further comprise one or more of the following optional features, considered either alone or in any technically possible combination.

In specific embodiments, the estimation method comprises a prior step of establishing the model comprising:

obtaining a plurality of calibration images of one or more gas flaring sites, said calibration images comprising pixels representing a radiation measured at acquisition dates in SWIR wavelengths;

segmenting the calibration images by detecting pixels which represent flared gas heated atmosphere, thereby obtaining segmented calibration images for the acquisition dates;

determining surfaces of flared gas heated atmosphere for the one or more gas flaring sites for the acquisition dates based on the segmented calibration images;

obtaining quantity values measured by one or more sensors located at the one or more gas flaring sites, said quantity values representative of the quantity of flared gas at the one or more gas flaring sites at the acquisition dates; and determining the model based on the surfaces of flared gas heated atmosphere in the calibration images and based on said quantity values.

Hence, the model used for estimating the quantity of flared gas based on an estimation image is established by using images, referred to as "calibration images," acquired in SWIR wavelengths. The SWIR wavelengths measured for the calibration images are preferably included at least in part in the SWIR wavelength band used by the image sensor used for acquiring the estimation image. These calibration images are acquired by one or more image sensors which may include the image sensor used for acquiring the estimation image and/or another image sensor having substantially the same properties, etc. These calibration images represent a gas flaring site (not necessarily the same gas flaring site as in the estimation image) for which local measurements of the quantities of flared gas are available. The model is therefore established by comparing the surfaces of flared gas heated atmosphere determined for the calibration images with the actual values of the flared gas quantities measured at the gas flaring site for the same acquisition dates.

It is emphasized that, while the establishment of the model may use quantities of flared gas measured locally at gas flaring sites, such in situ measurements are no longer necessary once the model is established. The model is established by using past in situ measurements and is then used to predict the quantity of flared gas without using in situ measurements but using only estimation images acquired by spaceborne image sensors.

In specific embodiments, segmenting the estimation image comprises comparing the pixel values with a predetermined threshold value. Typically, in a SWIR wavelength band, the pixels having high values (high temperature) will correspond to flared gas heated atmosphere. Hence, a threshold value may be predetermined to distinguish high pixel values (representative of high temperatures likely to be caused by gas flaring) from low pixel values (representative of low temperatures, i.e., not heated by gas flaring).

In specific embodiments, segmenting the estimation image comprises applying a fully convolutional neural network to the estimation image, said fully convolutional neural network trained for detecting pixels which represent flared gas heated atmosphere.

In specific embodiments, the estimation method comprises a prior step of training the fully convolutional neural network with training images comprising pixels annotated as representing or not representing flared gas heated atmosphere.

In specific embodiments, the annotation of the training images is carried out automatically by comparing the pixel values of the training images with a predetermined threshold value.

In specific embodiments, the fully convolutional neural network is a U-Net.

In specific embodiments, the SWIR wavelength band of the spaceborne image sensor is included between 2000 nm and 2500 nm, preferably between 2100 nm and 2300 nm.

In specific embodiments, a surface represented by any pixel of an image acquired by the spaceborne image sensor is equal or lower than 500 $m^2$.

In specific embodiments, the images are band-12 images acquired by the spaceborne image sensor of a Sentinel-2 satellite. For such images, the surface represented by each pixel is approximately 400 $m^2$ (around 20 m by 20 m).

In specific embodiments, the pixel values of the images acquired by the spaceborne image sensor represent reflectance values, and said method comprises converting the reflectance pixel values into radiance pixel values.

In specific embodiments, the estimation method comprises determining a temperature value representative of the ambient temperature at the gas flaring site during the acquisition of the estimation image and determining the quantity of flared gas based on the surface of flared gas heated atmosphere, on the model and on the temperature value.

In specific embodiments, the estimation method comprises determining a wind value representative of the wind speed at the gas flaring site during the acquisition of the estimation image and determining the quantity of flared gas based on the surface of flared gas heated atmosphere, on the model and on the wind value.

In specific embodiments, the estimation method comprises determining a humidity value representative of the ambient humidity at the gas flaring site during the acquisition of the estimation image and determining the quantity of flared gas based on the surface of flared gas heated atmosphere, on the model and on the humidity value.

According to a second aspect, the present disclosure relates to a computer program product comprising code instructions which, when executed by a processor, cause said processor to carry out an estimation method according to any one of the embodiments of the present disclosure.

According to a third aspect, the present disclosure relates to a computer-readable storage medium comprising instructions which, when executed by a processor, configure said processor to carry out an estimation method according to any one of the embodiments of the present disclosure.

According to a fourth aspect, the present disclosure relates to a system for estimating a quantity of gas flared at a gas flaring site, said system comprises a processing circuit configured to carry out an estimation method according to any one of the embodiments of the present disclosure.

BRIEF DESCRIPTION OF THE SEVERAL VIEWS OF THE DRAWINGS

The disclosure will be better understood upon reading the following description, given as an example that is in no way limiting, and made in reference to the figures in which.

In these figures, references identical from one figure to another designate identical or analogous elements. For reasons of clarity, the elements shown are not to scale, unless explicitly stated otherwise.

DETAILED DESCRIPTION

The present disclosure relates inter alia to a method 10 and system 50 for estimating a quantity of flared gas at a gas flaring site by using an estimation image acquired by a spaceborne image sensor. For instance, the image sensor is on-board a satellite in terrestrial orbit, e.g., a Low Earth Orbit (LEO), a Medium Earth Orbit (MEO), etc.

The spaceborne image sensor used to acquire the estimation image is configured to measure the radiation in a predetermined wavelength band in short-wave infrared, SWIR, wavelengths. The SWIR wavelengths are wavelengths between 1000 nm and 3000 nm. The SWIR wavelength band used by the image sensor is therefore included in the wavelength band [1000 nm, 3000 nm]. Indeed, flared gases usually have temperatures above 1300 K which can be detected in SWIR wavelengths.

Figure 1:
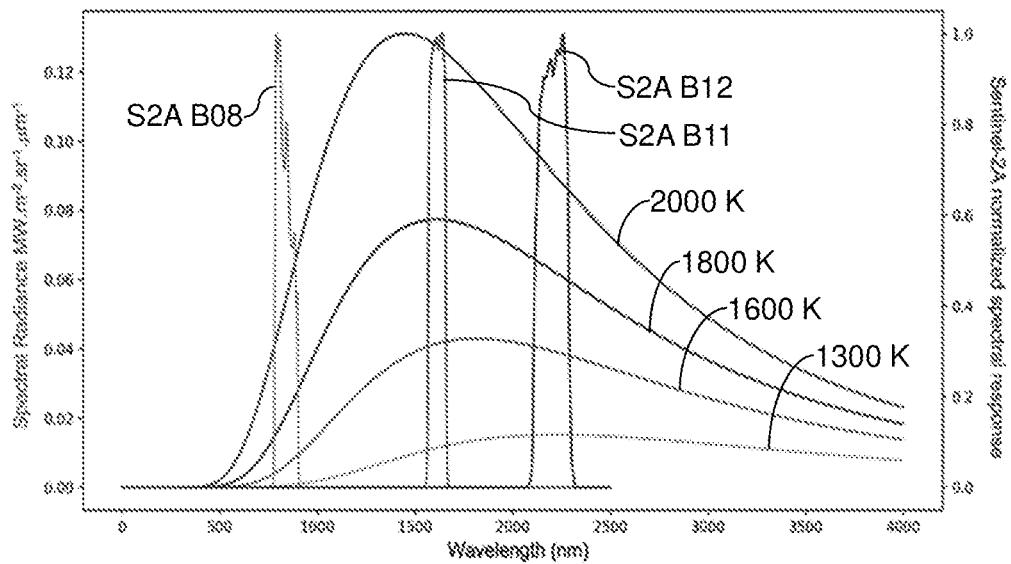
FIG. 1 is a schematic representation of the wavelength distribution for different temperature levels relevant for flared gas detection.

FIG. 1 represents schematically the wavelength distribution for different temperature levels relevant for flared gas detection, namely 1300 K, 1600 K, 1800 K and 2000 K. As can be seen in FIG. 1, the corresponding wavelength distributions have their respective absolute maximum values located in the SWIR wavelengths. In the present case, the images will be used not only to detect the gas flare itself, but also the surrounding atmospheric dome substantially heated by the gas flare. Hence, it is advantageous to try and detect temperatures below 1300 K, which will encompass not only the gas flare itself but also the surrounding heated atmosphere. For instance, the SWIR wavelength band used by the spaceborne image sensor may be included in the wavelength band [1500 nm, 2500 nm]. Since, the wavelength distribution for a temperature of around 1300 K has an absolute maximum value around 2200 nm, the SWIR wavelength band used by the image sensor is preferably included in the wavelength band [2000 nm, 2500 nm], or even more preferably in the wavelength band [2100 nm, 2300 nm].

Image sensors using such wavelength bands are already in use in existing orbiting satellites. For instance, the Sentinel-2 satellites include multi-spectral image sensors which measure images in several wavelength bands. Some of the wavelength bands used by these Sentinel-2 image sensors are represented in FIG. 1, referred to as respectively B12 ("S2A B12" in FIG. 1), B11 ("S2A B11" in FIG. 1) and B08 ("S2A B08" in FIG. 1). For instance, it is possible to use Sentinel-2 images obtained in one of these wavelength bands B12, B11 or B08 (preferably the wavelength band B12), or in any combination of these wavelength bands B12, B11 or B08. For instance, the image used to estimate the quantity of flared gas may be an image obtained by combining a B12 Sentinel-2 image and a B11 Sentinel-2 image of the gas flaring site, etc.

An image acquired by the spaceborne image sensor corresponds to a matrix of pixels, and each pixel value represents the radiation received from a respective portion of the observed scene. In the present disclosure, the resolution of an image corresponds to the surface of the portion of the observed scene represented by a pixel. For instance, in the case of a Sentinel-2 image, the surface (resolution) represented by a pixel is around 400 m$^2$. It should be noted that such pixel values representing the radiation measured in SWIR wavelengths, are sometimes also referred to as temperature values. Also, the radiation measured may include radiation emitted by the observed scene (a.k.a. radiance) or both radiations emitted and reflected by the observed scene (a.k.a. reflectance). If the pixel values correspond to reflectance values, they are preferably converted into radiance values beforehand, by using conversion techniques considered known to the skilled person. Indeed, the flared gas and the surrounding heated atmosphere are sources of radiation (i.e., they emit radiation) such that the radiation reflected by the scene (which comes from other sources, e.g., the Sun) may be considered to correspond to a noise.

Figure 2:
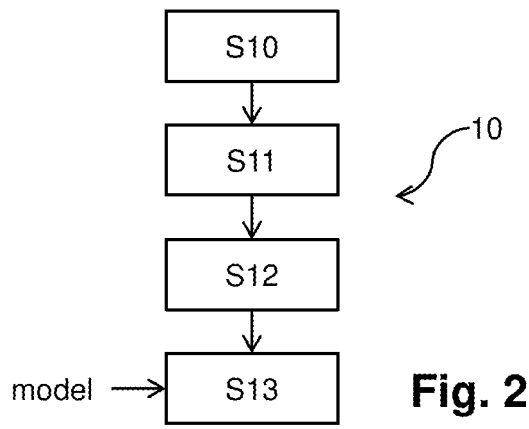
FIG. 2 is a flow chart illustrating the main steps of an exemplary embodiment of a method for estimating the quantity of flared gas at a gas flaring site.

FIG. 2 represents schematically the main steps of a method 10 for estimating a quantity of gas flared at a gas flaring site. The quantity of flared gas corresponds to any physical quantity representative of the amount of flared gas. Preferably, the quantity of flared gas is estimated as a gas flowrate.

As illustrated by FIG. 2, the estimation method 10 comprises a step S10 of obtaining an image of the gas flaring site, acquired by the spaceborne image sensor discussed above. The image used for estimating a quantity of gas flared at a gas flaring site is referred to as "estimation image". For instance, the estimation image may be an image acquired at a past acquisition date in which case it may be retrieved from a database. If not available, an acquisition request may be sent to the image sensor, and the resulting estimation image may be retrieved once acquired by said image sensor.

Then, the estimation method 10 comprises a step S11 of segmenting the estimation image. Basically, the goal of the step S11 of segmenting is to classify each pixel of the estimation image as either:

a pixel representing atmosphere heated by flared gas; or a pixel not representing atmosphere heated by flared gas.

Hence, the goal is to detect pixels which represent flared gas heated atmosphere. As discussed above, the atmosphere surrounding a gas flare will also be substantially heated by the flared gas and the amount of heated atmosphere increases with the quantity of flared gas. Since the pixel values are mainly temperature values, the pixels representing flared gas heated atmosphere can be detected by analyzing the pixel values.

According to a non-limitative example, pixels representing flared gas heated atmosphere may be detected by comparing the pixel values to a predetermined threshold value, used to distinguish high temperatures from low temperatures. In general, the temperature of the heated atmospheric dome around the gas flare will be higher than 400 K, i.e., substantially higher than the ambient temperature. Hence, in SWIR images, the contrast between pixels representing flared gas heated atmosphere and pixels not representing flared gas heated atmosphere will be important. Accordingly, the threshold value may be easily predetermined by analyzing SWIR images of gas flaring sites. Of course, other constraints may be considered when segmenting the estimation image using a threshold value. For instance, it is possible to also constrain the pixels representing flared gas heated atmosphere to correspond to adjacent pixels for a given gas flare. Indeed, an isolated pixel for which the value is above the threshold value is probably an artefact caused by, e.g., noise and should not be classified as flared gas heated atmosphere.

Using such a predetermined threshold value enables the segmentation to be performed in a simple and computationally effective manner. However, other segmentation methods may be considered in the estimation method 10, and the choice of a specific segmentation method corresponds merely to a specific embodiment of the present disclosure.

According to another non limitative example, the segmentation may use artificial intelligence-based methods, such as machine learning methods.

In preferred embodiments, the step S11 of segmenting the estimation image may use a fully convolutional neural network previously trained for detecting pixels which represent flared gas heated atmosphere. Fully convolutional neural networks are neural networks known to the skilled person used inter alia for image segmentation. It should be noted that the surfaces of flared gas heated atmosphere have typically simple shapes in the SWIR images (e.g., spikes, stars, circles, etc.), which makes them well suited for being detected by using a fully convolutional neural network (and facilitates its training).

In preferred embodiments, the fully convolutional neural network is a U-Net (see, e.g., the patent application publication WO 2021/148837 or the scientific paper [Ronneberger2015], incorporated herein by reference). Such U-Net fully convolutional networks typically comprise two main stages, a.k.a. encoder and decoder:
   the encoder (a.k.a. "contracting path") successively downsamples the input image (i.e., training image during the training of the fully convolutional neural network or estimation image during the estimation of the quantity of flared gas), and
   the decoder (also known as "contracting path") successively upsamples back to the original spatial resolution the image received from the encoder.

Indeed, experiments conducted by the inventors have shown that such a U-Net fully convolutional neural network provides good segmentation results for detecting flared gas heated atmosphere.

The training of such a fully convolutional neural network, for instance a U-Net, may use annotated training images, i.e., training images in which each pixel is already labelled as representing flared gas heated atmosphere or not representing flared gas heated atmosphere. These labels are considered to correspond to the "ground truth," i.e., the expected result of the segmentation of the training image. Such annotated training images are then used to iteratively optimize parameters of the fully convolutional neural network to obtain a parameterized fully convolutional neural network yielding substantially the same results as the expected results, for all training images.

The training images are also images acquired in SWIR wavelengths. The SWIR wavelengths measured for the training images are preferably included at least in part in the SWIR wavelength band used by the image sensor used for acquiring the estimation image. These training images are acquired by one or more image sensors which may include the image sensor used for acquiring the estimation image and/or another image sensor having substantially the same properties (including substantially the same resolution), etc. Preferably, the training images are all acquired by the image sensor used for acquiring the estimation image and/or by one or more image sensors having the substantially the same properties. For instance, the estimation image may be acquired by the image sensor of one of the Sentinel-2 satellites and the training images may be acquired by the image sensors of all Sentinel-2 satellites. Some at least of training images represent a gas flaring site (not necessarily the same gas flaring site as in the estimation image) and, at least for those training images that represent a gas flaring site, have their pixels annotated as representing flared gas heated atmosphere or not representing flared gas heated atmosphere.

For instance, the training images may be annotated manually, by a human operator. In preferred embodiments, the annotation of the training images is carried out automatically, e.g., by comparing the pixel values of the training images with the predetermined threshold value. In order words, the training images are automatically segmented by using the predetermined threshold value discussed above and the obtained annotated training images are used for training the fully convolutional neural network. Even if there might be few mislabeled pixels in such annotated training images, experiments conducted have shown that good segmentation results could be achieved with a U-Net trained with such annotated training images. In some cases, false detections (i.e., pixels mislabeled as representing flared gas heated atmosphere in the training images) were not reproduced by the trained U-Net.

As illustrated by FIG. 2, the estimation method 10 comprises a step S12 of determining a surface of flared gas heated atmosphere based on the segmented estimation image. The surface may be expressed as, e.g., square meters, a number of pixels, etc. In some cases, determining the surface of the flared gas heated atmosphere in the segmented estimation image may therefore resume to counting the number of pixels detected as representing flared gas heated atmosphere around the gas flare.

Of course, the accuracy with which the surface of flared gas heated atmosphere can be determined depends on the resolution of the image sensor used to acquire the estimation image. Preferably, the surface represented by each pixel in the estimation image is lower than 1 km$^2$, or even lower than 500 m$^2$. For instance, if the estimation image is a band-12 image acquired by the image sensor of a Sentinel-2 satellite, the surface represented by each pixel (i.e., resolution) is approximately 400 m$^2$ (around 20 m by 20 m).

As illustrated by FIG. 2, the estimation method 10 then comprises a step S13 of determining the quantity of flared gas in the estimation image, based on the surface of flared gas heated atmosphere, by using a previously established model describing the relation between the surface of flared gas heated atmosphere detected in an image and the quantity of flared gas needed to heat the surrounding atmosphere of gas flare over the detected surface.

Figure 3:
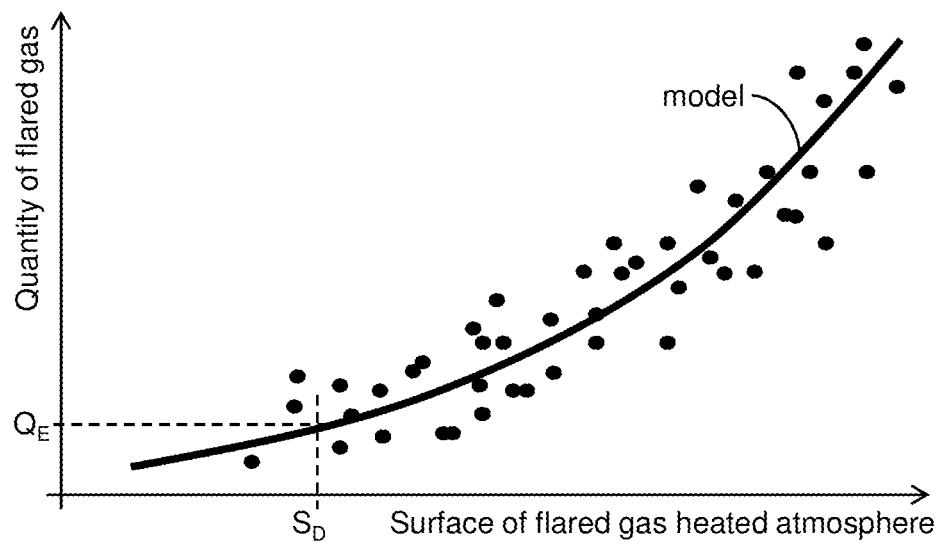
FIG. 3 is a schematic representation of a model used for estimating the quantity of gas flared at a gas flaring site.

As discussed above, such a model may for instance be established as one or more lookup tables (LUTs), or as one or more mathematical functions, etc. FIG. 3 represents schematically an example of model represented as a solid line. As can be seen in FIG. 3, the model represented receives as input the surface SD of flared gas heated atmosphere detected in the estimation image and returns an estimated quantity QE of flared gas for the acquisition date of the estimation image and the gas flaring site represented in said estimation image. It should be noted that other representations are possible. In particular, it is also possible to have more than one mathematical function (or LUTs), e.g., an upper bound mathematical function and a lower bound mathematical function, in order to return an upper bound $Q_{Emax}$ and a lower bound $Q_{Emin}$ for the estimated quantity of flared gas.

The model may be pre-established during a prior step S14 and, e.g., stored in and retrieved from a database. If different image sensors can be used to acquire estimation images, it is possible to consider a plurality of different models respectively associated to these different image sensors. When executing the estimation step S13, only the model associated to the image sensor used to acquire the current estimation image is retrieved from the database and used for estimating the quantity of flared gas.

Figure 4:
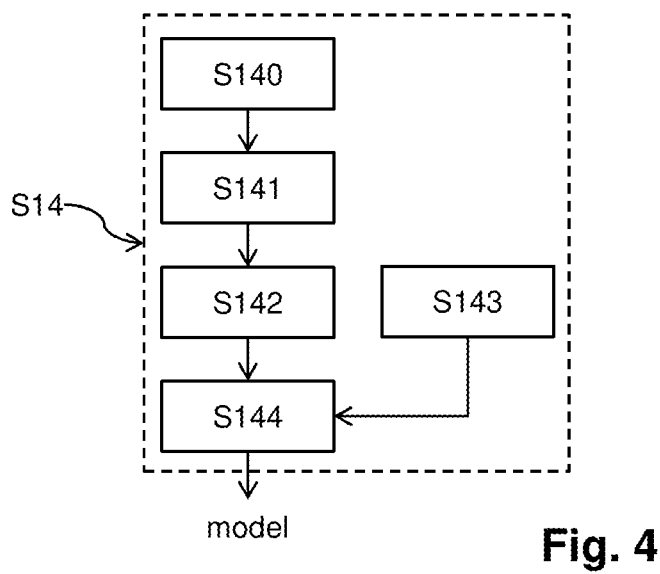
FIG. 4 is a flow chart illustrating the main steps of an exemplary embodiment of a step of establishing the model.

FIG. 4 represents schematically a preferred embodiment of the step S14 of establishing the model. As illustrated by FIG. 4, the step S14 of establishing the model comprises:
- a step S140 obtaining a plurality of calibration images of one or more gas flaring sites, said calibration images comprising pixels representing a radiation measured at acquisition dates in SWIR wavelengths;
- a step S141 of segmenting the calibration images by detecting pixels which represent flared gas heated atmosphere, thereby obtaining segmented calibration images for the acquisition dates;
- a step S142 of determining surfaces of flared gas heated atmosphere for the one or more gas flaring sites for the acquisition dates based on the segmented calibration images.

Hence, the establishment step S14 uses images, referred to as "calibration images," acquired in SWIR wavelengths. The SWIR wavelengths measured for the calibration images are preferably included at least in part in the SWIR wavelength band used by the image sensor used for acquiring the estimation image. These calibration images are acquired by one or more image sensors which may include the image sensor used for acquiring the estimation image and/or another image sensor having substantially the same properties (including the same resolution), etc. Preferably, the calibration images are all acquired by the image sensor used for acquiring the estimation image and/or by one or more image sensors having the substantially the same properties. For instance, the estimation image may be acquired by the image sensor of one of the Sentinel-2 satellites and the calibration images may be acquired by the image sensors of all Sentinel-2 satellites.

The acquisition dates of the calibration images are obtained with said calibration images. In other words, the calibration images are timestamped. It should be noted that the acquisition date here comprises not only the day of the acquisition but also the time of the acquisition.

The step S141 of segmenting a calibration image is substantially the same as the step S11 of segmenting the estimation image.

Similarly, the step S142 of determining the surface of flared gas heated atmosphere in a segmented calibration image is substantially the same as the step S12 of determining the surface of flared gas heated atmosphere in the segmented estimation image. As discussed above, the surface may be expressed in square meters, a number of pixels, etc. For instance, if the same image sensor is used for acquiring the estimation image and the calibration images, the surface may be determined as a number of pixels, since the resolution is the same in the estimation and calibration images. If the image sensor used for acquiring the estimation image has a different resolution than the image sensor(s) used for acquiring the calibration images, the surface may be determined in square meters, etc. In the end, the surface determined in the segmented estimation image needs to compare with the surfaces in the model. Conversion from square meters and number of pixels (and vice versa) may be performed by considering the resolution (surface represented by a pixel) of the different image sensors used.

The calibration images represent a gas flaring site (not necessarily the same gas flaring site as in the estimation image) for which local measurements of the quantities of flared gas are available. Hence, the gas flaring sites represented in the calibration images have local sensors which measure over time the quantity of flared gas and these measurements, referred to as quantity values and available for at least the acquisition dates of the calibration images, are obtained during a step S143 of the step S14 of establishing the model. It should be noted that a quantity value may not be available for exactly the same acquisition date (i.e., day and time of the day) of a calibration image. Hence, the quantity values considered are quantity values measured approximately at the acquisition dates of the calibration images, preferably separated from the acquisition dates by less than 10 minutes.

The step S14 of establishing the model comprises a step S144 of determining the model based on the surfaces of flared gas heated atmosphere in the calibration images and based on said quantity values.

Indeed, the quantity values are also timestamped such that a correspondence can be established between quantity values and calibration images. These quantity values can therefore be used to determine a quantity of flared gas associated to each calibration image, and to the surface of flared gas heated atmosphere determined for each calibration image. For instance, a plurality of pairs (surface, quantity) may be determined and used to determine the model. FIG. 3 shows examples of pairs (surface, quantity), represented as dots, obtained by comparing the surfaces of flared gas heated atmosphere in the calibration images with the quantity values measured at the gas flaring site(s). Based on these pairs (surface, quantity), the model may be determined by using any method known to the skilled person and the choice of a specific method corresponds merely to a specific embodiment of the present disclosure. For instance, the model may be established by performing a polynomial regression on the pairs (surface, quantity).

It should be noted that further parameters may be considered when processing the images (estimation image and/or calibration image and/or training image), in order to improve the accuracy of the estimation method 10.

Figure 5:
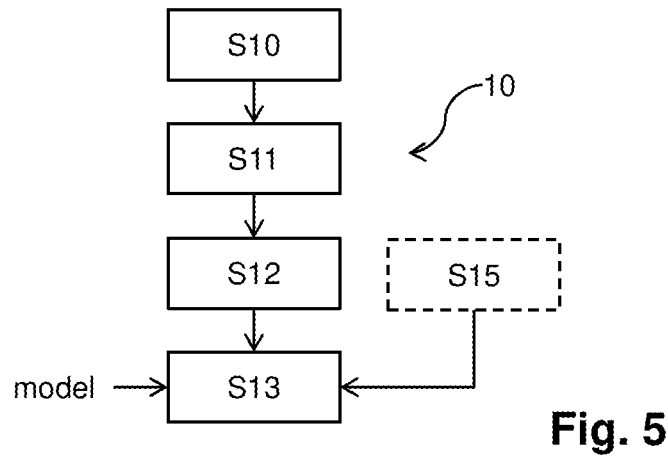
FIG. 5 is a flow chart illustrating the main steps of a preferred embodiment of the method for estimating the quantity of flared gas at a gas flaring site.

FIG. 5 represents schematically the main steps of a preferred embodiment of the estimation method 10. As illustrated by FIG. 5, the estimation method 10 comprises a further step S15 of determining a value for a predetermined atmospheric parameter. This atmospheric parameter value is then used, during step S13, for determining the quantity of flared gas, together with the model and the surface of flared gas heated atmosphere.

According to a first example, the atmospheric parameter value corresponds to a temperature value representative of the ambient temperature at the gas flaring site during the acquisition of the estimation image. Indeed, a low ambient temperature will cool the atmospheric heated dome, leading to a lower detected surface of flared gas heated atmosphere. In other words, for a same quantity of flared gas at a gas flaring site, the surface of flared gas heated atmosphere tends to increase with the ambient temperature. Hence, the quantity of flared gas is preferably determined by considering the ambient temperature at the gas flaring site during the acquisition of the estimation image. For instance, it is possible to establish beforehand a plurality of models associated respectively to different temperature values, by, e.g., repeating step S14 for different temperature values. Step S13 comprises in this case a step of retrieving, among the plurality of models, the model associated to the temperature value determined at step S15 and using the retrieved model to determine the quantity of flared gas based on the surface of flared gas heated atmosphere, as discussed above. According to another example, it is possible to establish beforehand a single model associated to a reference temperature value and to determine a plurality of surface correcting factors associated respectively to different temperature values by, e.g., comparing the surfaces of flared gas heated atmosphere obtained in calibration images for different temperature values and for a same quantity of flared gas. The surface correcting factor for the reference temperature value is, e.g., equal to one and is for instance lower than one for temperature values higher than the reference temperature value. Step S13 comprises, in this case, a step of retrieving, among the plurality of surface correcting factors, the surface correcting factor associated to the temperature value determined at step 15 and using the retrieved surface correcting factor to correct the surface of flared gas heated atmosphere (by multiplying the surface of flared gas heated atmosphere by the surface correcting factor in this example). The quantity of flared gas can be determined during step S13 based on the model and based on the corrected surface of flared gas heated atmosphere, as discussed above.

According to a second example, the atmospheric parameter value corresponds to a wind value representative of the wind speed at the gas flaring site during the acquisition of the estimation image. Indeed, for a same quantity of flared gas at a gas flaring site, the surface of flared gas heated atmosphere will tend to decrease with the wind speed. Hence, the quantity of flared gas is preferably determined by considering the wind speed at the gas flaring site during the acquisition of the estimation image. For instance, it is possible to establish beforehand a plurality of models associated respectively to different wind values, by, e.g., repeating step S14 for different wind values. Step S13 comprises in this case a step of retrieving, among the plurality of models, the model associated to the wind value determined at step S15 and using the retrieved model to determine the quantity of flared gas based on the surface of flared gas heated atmosphere, as discussed above. According to another example, it is possible to establish beforehand a single model associated to a reference wind value (for instance no wind) and to determine a plurality of surface correcting factors associated respectively to different wind values by, e.g., comparing the surfaces of flared gas heated atmosphere obtained in calibration images for different wind values and for a same quantity of flared gas. The surface correcting factor for the reference wind value is, e.g., equal to one and is for instance higher than one for wind values higher than the reference wind value. Step S13 comprises in this case a step of retrieving, among the plurality of surface correcting factors, the surface correcting factor associated to the wind value determined at step 15 and using the retrieved surface correcting factor to correct the surface of flared gas heated atmosphere (by multiplying the surface of flared gas heated atmosphere by the surface correcting factor in this example). The quantity of flared gas can be determined during step S13 based on the model and based on the corrected surface of flared gas heated atmosphere, as discussed above.

According to a third example, the atmospheric parameter value corresponds to a humidity value representative of the ambient humidity at the gas flaring site during the acquisition of the estimation image. The ambient humidity at the gas flaring site influences heat transfer, such that for a same quantity of flared gas at the gas flaring site, the surface of flared gas heated atmosphere will depend on the ambient humidity. Hence, the quantity of flared gas is preferably determined by considering the ambient humidity at the gas flaring site during the acquisition of the estimation image. For instance, it is possible to establish beforehand a plurality of models associated respectively to different humidity values, by, e.g., repeating step S14 for different humidity values. Step S13 comprises in this case a step of retrieving, among the plurality of models, the model associated to the humidity value determined at step S15 and using the retrieved model to determine the quantity of flared gas based on the surface of flared gas heated atmosphere, as discussed above. According to another example, it is possible to establish beforehand a single model associated to a reference humidity value and to determine a plurality of surface correcting factors associated respectively to different humidity values by, e.g., comparing the surfaces of flared gas heated atmosphere obtained in calibration images for different humidity values and for a same quantity of flared gas. Step S13 comprises in this case a step of retrieving, among the plurality of surface correcting factors, the surface correcting factor associated to the humidity value determined at step 15 and using the retrieved surface correcting factor to correct the surface of flared gas heated atmosphere (by multiplying the surface of flared gas heated atmosphere by the surface correcting factor in this example). The quantity of flared gas can be determined during step S13 based on the model and based on the corrected surface of flared gas heated atmosphere, as discussed above.

Of course, it is possible to consider other atmospheric parameters. Also, it is possible to consider a plurality of atmospheric parameters in the estimation method 10. For instance, the temperature value, the wind value, and the humidity value may be considered during the estimation of the quantity of flared gas, etc. These atmospheric parameters can be determined by using any method known to the skilled person. For instance, these atmospheric parameters can be measured separately from the multi-spectral images.

Figure 6:
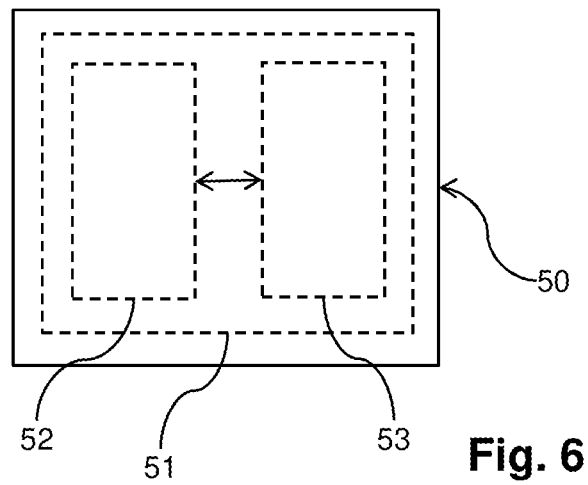
FIG. 6 is a schematic representation of a system for estimating the quantity of gas flared at a gas flaring site.

FIG. 6 represents an exemplary embodiment of a system 50 for estimating a quantity of gas flared at a gas flaring site. As can be seen in FIG. 6, said system 50 comprises a processing circuit 51 comprising one or more processors 52 and storage means 53 (magnetic hard disk, solid-state disk, optical disk, electronical memory, etc., i.e., any type of computer-readable storage medium) in which a computer program product is stored, in the form of a set of program-code instructions to be executed in order to implement all or part of the steps of the estimation method 10. Alternatively, or in combination thereof, the processing circuit 51 can comprise one or more programmable logic circuits (FPGA, PLD, etc.), and/or one or more specialized integrated circuits (ASIC), and/or a set of discrete electronic components, etc., adapted for implementing all or part of the steps of the estimation method 10.

In other words, the processing circuit 51 corresponds to a set of means configured by software (specific computer program product) and/or by hardware (processor, FPGA, PLD, ASIC, discrete electronic components, etc.) to implement all or part of the steps of the estimation method 10.

It is emphasized that the present disclosure is not limited to the above exemplary embodiments. Variants of the above exemplary embodiments are also within the scope of the present disclosure.

For instance, it should be noted that some processing steps may be carried out on the images (estimation image and/or calibration image and/or training image) in order to improve the accuracy of the estimation method 10.

For instance, clouds may impact the detection of flared gas heated atmosphere, since they reduce the amount of radiation received in the SWIR wavelengths. Hence, the images are preferably processed to discard images in which the cloud coverage is too important and/or to mask in the images the pixels which represent clouds (if the clouds are not above the gas flaring site). For instance, images acquired by Sentinel-2 satellites are provided with metadata which may be used to determine a pixelwise probability of cloud coverage which can be used to discard images and/or to mask some pixels in the images.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

REFERENCES

[Ronneberger2015] Olaf Ronneberger, Philipp Fischer and Thomas Brox, "U-Net: Convolutional Networks for Biomedical Image Segmentation," *International Conference on Medical image computing and computer-assisted intervention*, Springer, Cham, 2015. pp. 234-241, arXiv: 1505.04597

The invention claimed is:

1. A computer-implemented method for estimating a quantity of gas flared at a gas flaring site, wherein said method comprises:
   obtaining an estimation image of the gas flaring site, said estimation image acquired by a spaceborne image sensor and comprising pixels representing a radiation measured in a short-wave infrared (SWIR) wavelength band;
   segmenting the estimation image by detecting pixels which represent flared gas heated atmosphere, thereby obtaining a segmented estimation image;
   determining a surface of flared gas heated atmosphere based on the segmented estimation image;
   estimating the quantity of gas flared based on the surface of flared gas heated atmosphere, by using a model associating surfaces of flared gas heated atmosphere with corresponding quantities of gas flared; and
   outputting the estimated quantity of gas flared for verification of the quantity of gas flared.

2. The method according to claim 1, wherein determining the surface of flared gas heated atmosphere based on the segmented estimation image comprises:
   determining a number of pixels representing flared gas heated atmosphere in the segmented estimation image; and
   determining the surface of flared gas heated atmosphere based on the number of pixels representing flared gas heated atmosphere.

3. The method according to claim 1, comprising a prior step of establishing the model comprising:
   obtaining a plurality of calibration images of one or more gas flaring sites, said calibration images comprising pixels representing a radiation measured at acquisition dates in the same SWIR wavelength band as the spaceborne image sensor;
   segmenting the calibration images by detecting pixels which represent flared gas heated atmosphere, thereby obtaining segmented calibration images for the acquisition dates;
   determining surfaces of flared gas heated atmosphere for the one or more gas flaring sites for the acquisition dates based on the segmented calibration images;
   obtaining quantity values measured by one or more sensors located at the one or more gas flaring sites, said quantity values representative of the quantity of gas flared at the one or more gas flaring sites at the acquisition dates; and
   establishing the model based on the surfaces of flared gas heated atmosphere in the calibration images and based on said quantity values.

4. The method according to claim 1, wherein segmenting the estimation image comprises comparing pixel values of the pixels with a predetermined threshold value.

5. The method according to claim 1, wherein segmenting the estimation image comprises applying a fully convolutional neural network to the estimation image, said fully convolutional neural network trained for detecting pixels which represent flared gas heated atmosphere.

6. The method according to claim 5, further comprising a prior step of training the fully convolutional neural network with training images comprising pixels annotated as representing or not representing flared gas heated atmosphere.

7. The method according to claim 6, wherein annotation of the training images is carried out automatically by comparing pixel values of the pixels in the training images with a predetermined threshold value.

8. The method according to claim 5, wherein the fully convolutional neural network is a U-Net.

9. The method according to claim 1, wherein the SWIR wavelength band of the spaceborne image sensor is included between 2000 nm and 2500 nm.

10. The method according to claim 1, wherein a surface represented by any pixel of an image acquired by the spaceborne image sensor is equal or lower than 500 m$^2$.

11. The method according to claim 1, wherein pixel values of the pixels in the estimation image acquired by the spaceborne image sensor represent reflectance values, and said method comprises converting the reflectance values into radiance pixel values.

12. The method according to claim 1, further comprising:
   determining a temperature value representative of an ambient temperature at the gas flaring site during acquisition of the estimation image, and
   estimating the quantity of gas flared based on the surface of flared gas heated atmosphere, on the model, and on the temperature value.

13. The method according to claim 1, further comprising:
   determining a wind value representative of a wind speed at the gas flaring site during acquisition of the estimation image, and
   estimating the quantity of gas flared based on the surface of flared gas heated atmosphere, on the model, and on the wind value.

14. The method according to claim 1, further comprising:
   determining a humidity value representative of an ambient humidity at the gas flaring site during acquisition of the estimation image, and
   estimating the quantity of gas flared based on the surface of flared gas heated atmosphere, on the model, and on the humidity value.

15. A computer program product comprising code instructions stored on a non-transitory computer-readable storage medium which, when executed by at least one processor, cause said at least one processor to carry out the method as claimed in claim 1.

16. A non-transitory computer-readable storage medium containing instructions which, when executed by at least one processor, configure said at least one processor to carry out the method as claimed in claim 1.

17. A system for estimating a quantity of gas flared at a gas flaring site, comprising:
a processing circuit configured to:
obtain an estimation image of the gas flaring site, said estimation image acquired by a spaceborne image sensor and comprising pixels representing a radiation measured in a short-wave infrared (SWIR) wavelength band;
segment the estimation image by detecting pixels which represent flared gas heated atmosphere, thereby obtaining a segmented estimation image;
determine a surface of flared gas heated atmosphere based on the segmented estimation image;
estimate the quantity of gas flared based on the surface of flared gas heated atmosphere by using a model associating surfaces of flared gas heated atmosphere with corresponding quantities of gas flared; and
output the estimated quantity of gas flared for verification of the quantity of gas flared.

18. The system according to claim 17, wherein the processing circuit is configured to establish the model by:
obtaining a plurality of calibration images of one or more gas flaring sites, said calibration images comprising pixels representing a radiation measured at acquisition dates in the same SWIR wavelength band as the spaceborne image sensor;
segmenting the calibration images by detecting pixels which represent flared gas heated atmosphere, thereby obtaining segmented calibration images for the acquisition dates;
determining surfaces of flared gas heated atmosphere for the one or more gas flaring sites for the acquisition dates based on the segmented calibration images;
obtaining quantity values measured by one or more sensors located at the one or more gas flaring sites, said quantity values representative of the quantity of gas flared at the one or more gas flaring sites at the acquisition dates; and
establishing the model based on the surfaces of flared gas heated atmosphere in the calibration images and based on said quantity values.

19. The system according to claim 17, wherein the processing circuit is configured to segment the estimation image by comparing pixel values of the pixels with a predetermined threshold value.

20. The system according to claim 17, wherein the processing circuit is configured to segment the estimation image by applying a fully convolutional neural network to the estimation image, wherein the fully convolutional neural network is trained to detect pixels which represent flared gas heated atmosphere.

* * * * *